June 22, 1965   R. P. GREEN ET AL   3,190,621
TRANSIT MIXER
Filed Feb. 6, 1963   6 Sheets-Sheet 4

Inventors:
Rowland Percy Green
and
Harold Raymond Cowley
By Baldwin & Wight
Attorneys June 22, 1965  R. P. GREEN ET AL  3,190,621
TRANSIT MIXER Filed Feb. 6, 1963  6 Sheets-Sheet 5

Inventors:
Rowland Percy Green
and
Harold Raymond Cowley
By Baldwin & Wight
Attorneys

United States Patent Office 3,190,621
Patented June 22, 1965

3,190,621
TRANSIT MIXER
Rowland Percy Green and Harold Raymond Cowley, Bath, Somerset, England, assignors to Stothert & Pitt, Limited, Bath, Somerset, England, a company of the United Kingdom
Filed Feb. 6, 1963, Ser. No. 256,569
16 Claims. (Cl. 259—177)

This invention relates to a truck mixer sometimes known as a transit mixer, in which the drum is rotatably supported on a truck chassis, provision being made to rotate the drum at a speed which is variable in order to provide for mixing, agitating and discharge.

With the increasing use of ready-mixed concrete in building work, there is a demand for larger capacity truck mixers and the object of this invention is to provide an improved design of mixer which enables a drum of maximum capacity to be fitted within the safe limits of the chassis and at the same time to utilize the available space to accommodate the ancillary operational components, including the transmission drive to the drum and water tanks, to the best advantage.

According to the invention, the chassis suspension for the mixing drum comprises a front and rear pedestal in which the front pedestal carries the main bearing for the drum at its forward end and the rear pedestal is provided with transversely spaced support points for the rollers which support the drum at its rear end; the drum preferably being fitted with a ring constituting the rolling path.

By providing a three-point suspension, it has the advantage that it caters for any chassis weave that is liable to occur in operating on different terrain. The front pedestal mounting may consist of a triangular shaped structure in which are housed the hydraulic drive components for the drum, including a pump and motor.

The main bearing for the drum may comprise an axle turning in taper rollers mounted in a housing in the form of a spherical or like contoured hollow casting which in turn is mounted in a spherical correspondingly formed two-part housing, the upper part being detachably secured to the lower part which is fast on the front pedestal so as to permit removal of the drum and bearing assembly. The axle shaft, by which the drum is rotatably supported in the main bearing, is preferably of tubular construction, the bore of which provides a flow passage for introduction of water into the drum.

Similarly the front pedestal may be connected to the rear support structure by hollow section members, e.g. tie bolts housing water and hydraulic feed lines.

The rear pedestal which may consist of a fabricated steel tank for storage of conditioning water is of triangular formation and provides the transversely spaced support points for the drum rollers. The tank likewise is provided with a three-point suspension on the chassis to compensate for chassis weave without undue stressing of the water tank, the supports of which are secured by clamping to the chassis at the points of maximum load. In the tank is a recess to receive a detachable auxiliary tank for additive liquid.

The hydraulic transmission system for imparting drive to the drum is through high pressure oil from a variable displacement pump of the axial piston type, the pump, which is driven by a universally jointed shaft from the truck engine, delivering oil to e.g. a fixed angle axial piston motor in unit with an epicyclic or other reduction gearbox. Both the motor and pump components are housed in the front pedestal for the main drum bearing and are arranged to form a closed circuit which cannot easily be contaminated by external dirt.

The invention is illustrated in the accompanying drawings in which.

Figure 3:
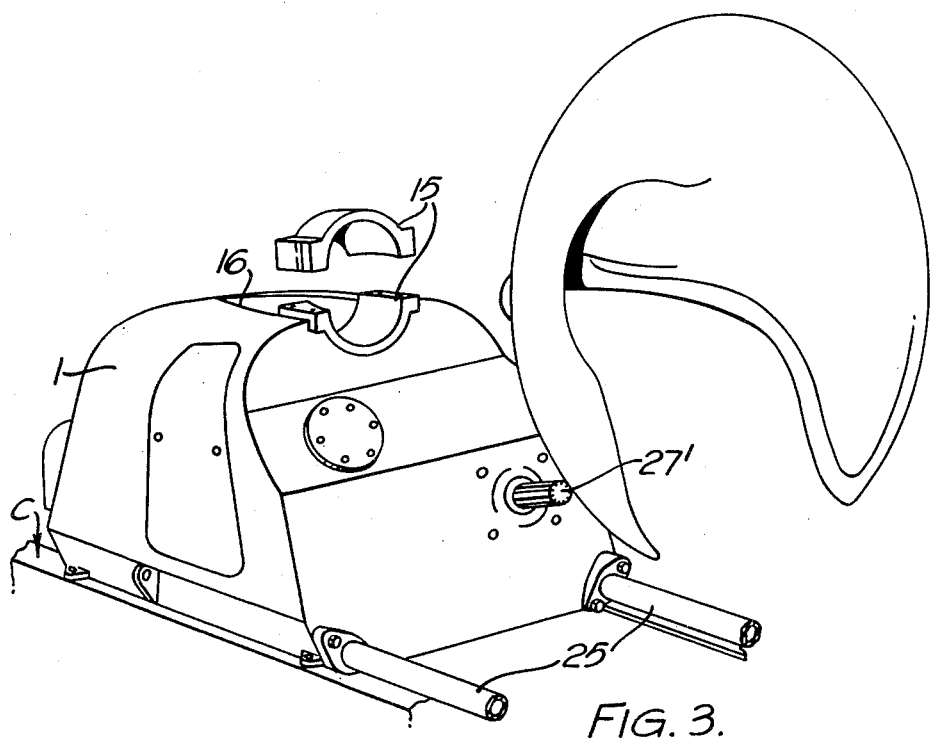
Figure 4:
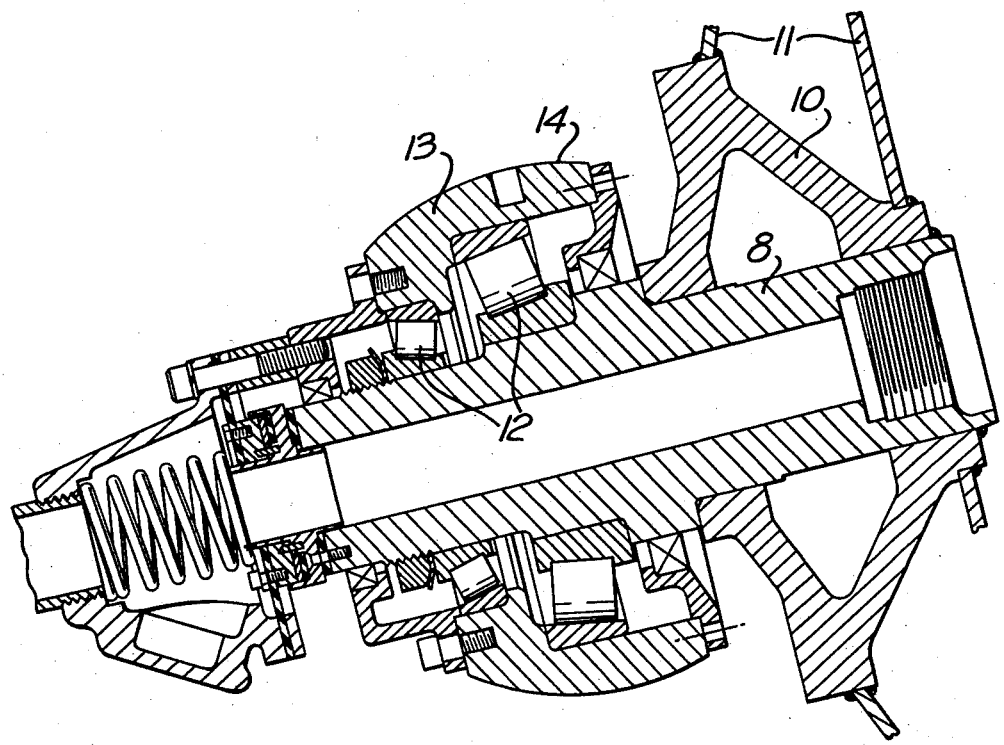
Figure 5:
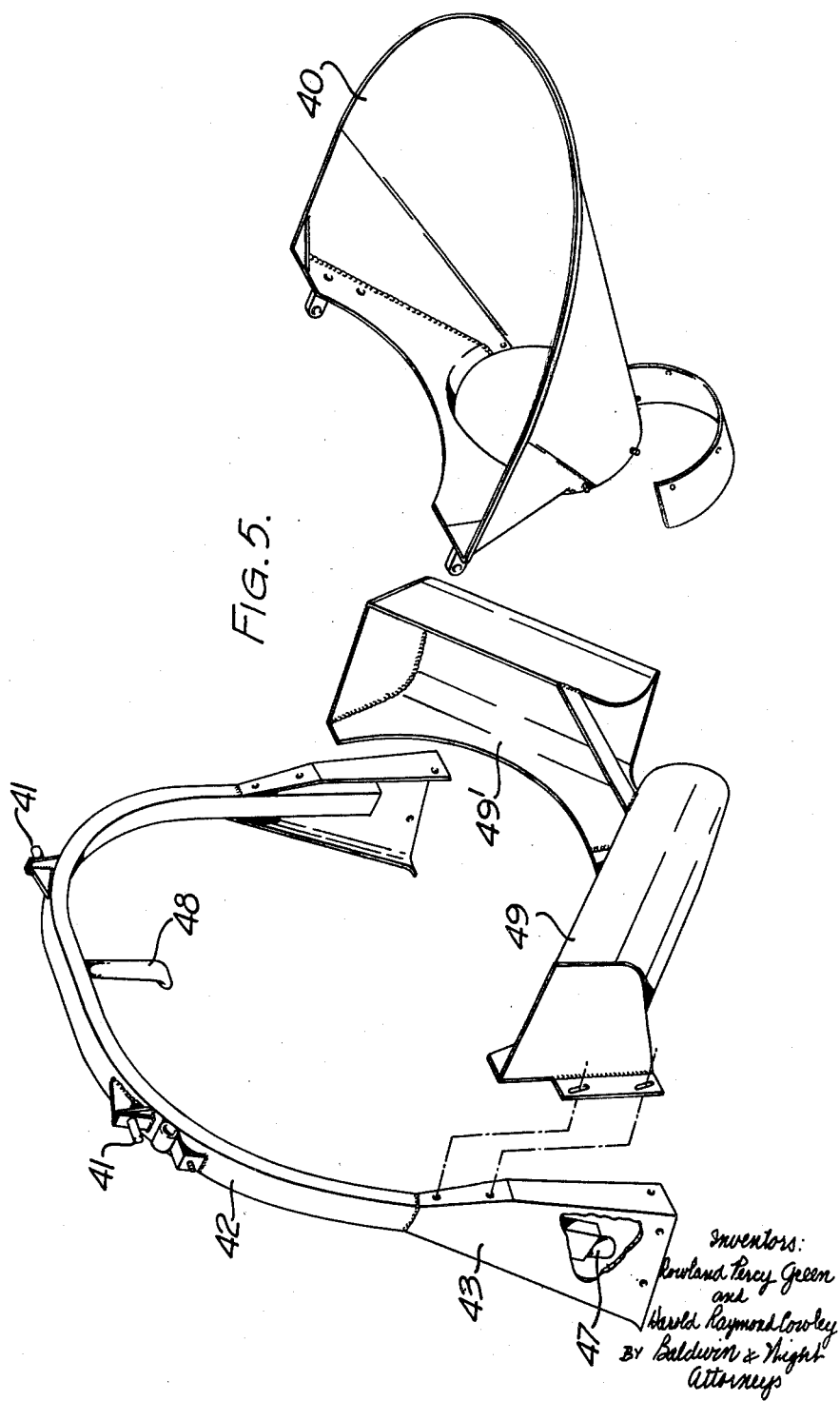
Figure 6:
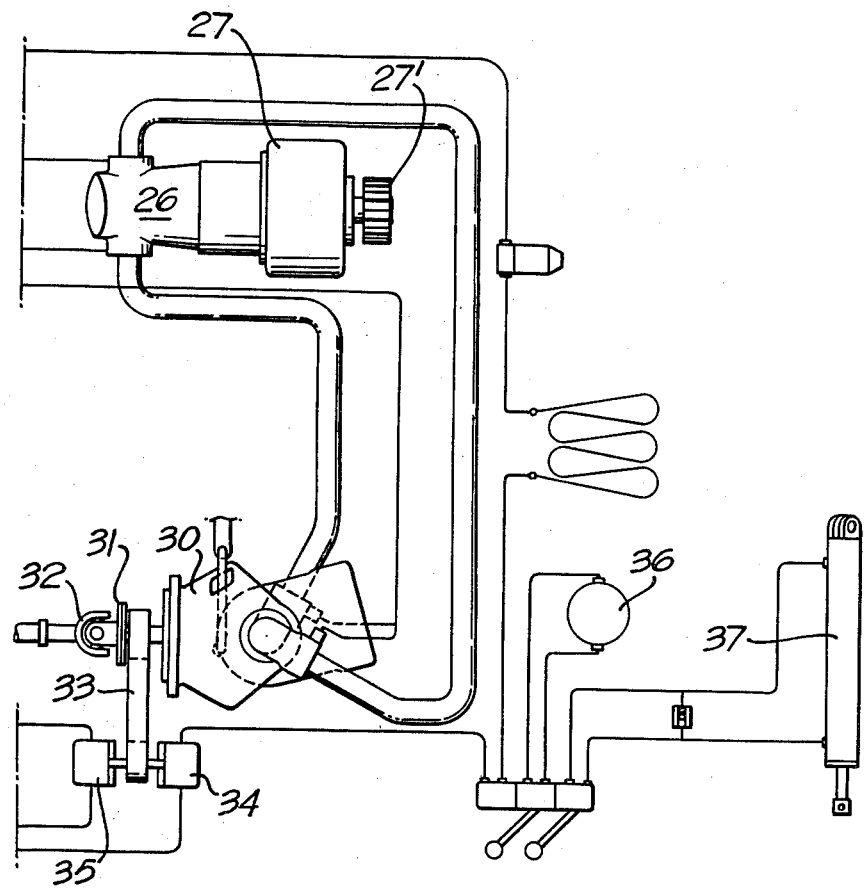

FIGURE 3 being a corresponding view of the front pedestal,

FIGURE 4 is a section on an enlarged scale of the main bearing for the drum,

FIGURE 5 is an exploded perspective view showing the feed chute for the drum, the feed and distribution chutes for the drum together with the rear end water supply for the drum, and FIGURE 6 is a diagram showing the main drive motor and the main drive transmission pump together with the ram operating the feed chute and controls therefor.

Referring to the drawings the truck mixer comprises a chassis C supported by a front steerable bogie F and a rear bogie R. D is the driver's cabin. The mixing drum is indicated generally at A.

Figure 2:
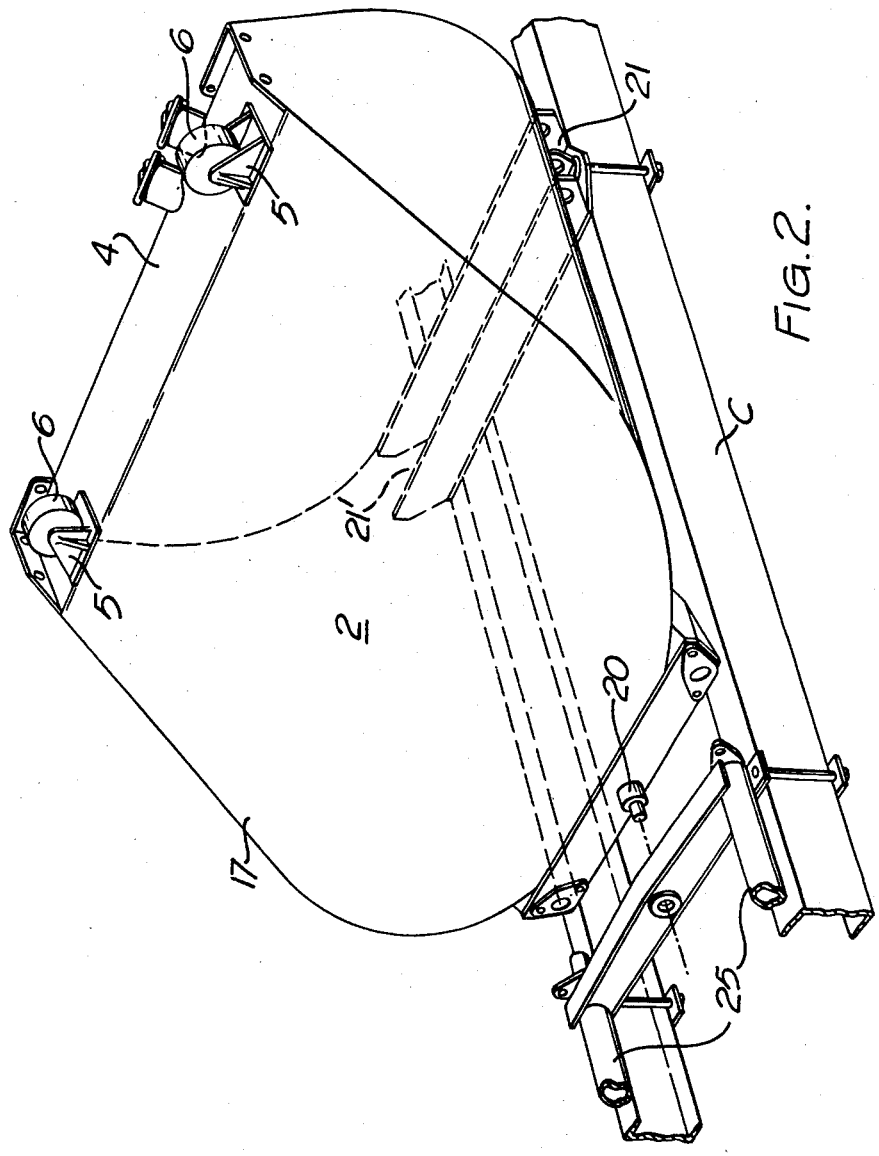
FIGURE 2 is a perspective view showing the rear pedestal.

The chassis suspension for the mixing drum A comprises a front pedestal 1 and a rear pedestal 2 on which the drum is rotatably carried, the rear pedestal 2 (FIGURE 2) being provided with a flat 4 on which are transversely spaced brackets 5 fitted with rollers 6 for engagement with a band 7 on the rear end of the drum A.

The front and main bearing consists of a shaft 8 fast on which is a collar 10 to which is secured by welds the front wall plates 11 of the drum. Shaft 8 revolves in double taper rollers indicated at 12 housed in a spherical bearing ring element in the form of a hollow casting 13 having a spherically contoured outer surface 14 by which in turn it is mounted in a correspondingly spherically formed seat in a housing 15 (FIGURE 3). Housing 15 is formed in two parts, its lower part seating in a recess 16 in the front pedestal 1 and its upper part being detachable to permit removal of the drum and the bearing assembly.

The provision of a three-point suspension as provided by the main front axle bearing assembly 7–15 and the two rear rollers supports 6 takes care of any chassis weave over uneven ground.

Both the front and rear pedestals 1 and 2 are triangular in elevation and are each fabricated in the form of a tank. The rear pedestal 2 has a tapered upper side indicated at 17 to conform to the angle of the conical end portion 17' of the drum D. The corresponding forward end portion 18 of the drum A lies parallel to the chassis so that a particular form of suspension occupies the minimum space.

The rear pedestal 2 consists of a fabricated steel tank which is itself provided with a three-point suspension indicated respectively at 20, 21, 21' on the chassis so as to permit chassis weave without undue straining of the tank which provides a reservoir for water. The support points 20, 21, 21' are located at the points of maximum load, two (21, 21') being located respectively on longitudinal frame members at opposite sides of the chassis and the other (20) being located centrally between the longitudinal frame members. Located in a recess at the rear of the tank 2 is an auxiliary tank 23 for additive liquid.

The front pedestal is connected to the rear pedestal 2 by means of tie bolts 25, which bolts are hollow and serve as a means for housing water and hydraulic feed lines. Housed within the front pedestal is a drive motor 26 and gear box 27 for the drum A, drive being transmitted through a pinion 27' to an internal toothed gear ring 28 mounted in a recess in the forward end of the drum A: by arranging the drive in a slightly offset position it minimizes gear movement during chassis operation.

The provision of an internal gear ring has considerable advantages over the external type, in that it allows more pinion teeth in contact with it, and thereby permits a smaller proportioned gear to be used than would otherwise be the case from the point of view of wear and strength. The capacity of such gears is much higher than the external type and allows a narrow gear ring to be used, which in turn is more likely to ensure that tooth load is applied more evenly across the face width than would be the case with relatively wide teeth of an external gear. It will be appreciated that the weaving of the chassis brings about mal-alignment of this gear under normal operating conditions and a narrow gear is, therefore, more suited.

The main drive transmission pump (not shown) is housed within an hydraulic reservoir 30, which itself is also housed inside the front pedestal 1. This pump is directly coupled at 31 to the engine drive shaft 32 from which an auxiliary drive 33 is taken to two smaller hydraulic pumps 34 and 35, one pump 35 providing make-up oil and servo power for the main circuit, the other pump 34 driving a water pump motor indicated at 36 and a hydraulic chute ram 37.

Figure 1:
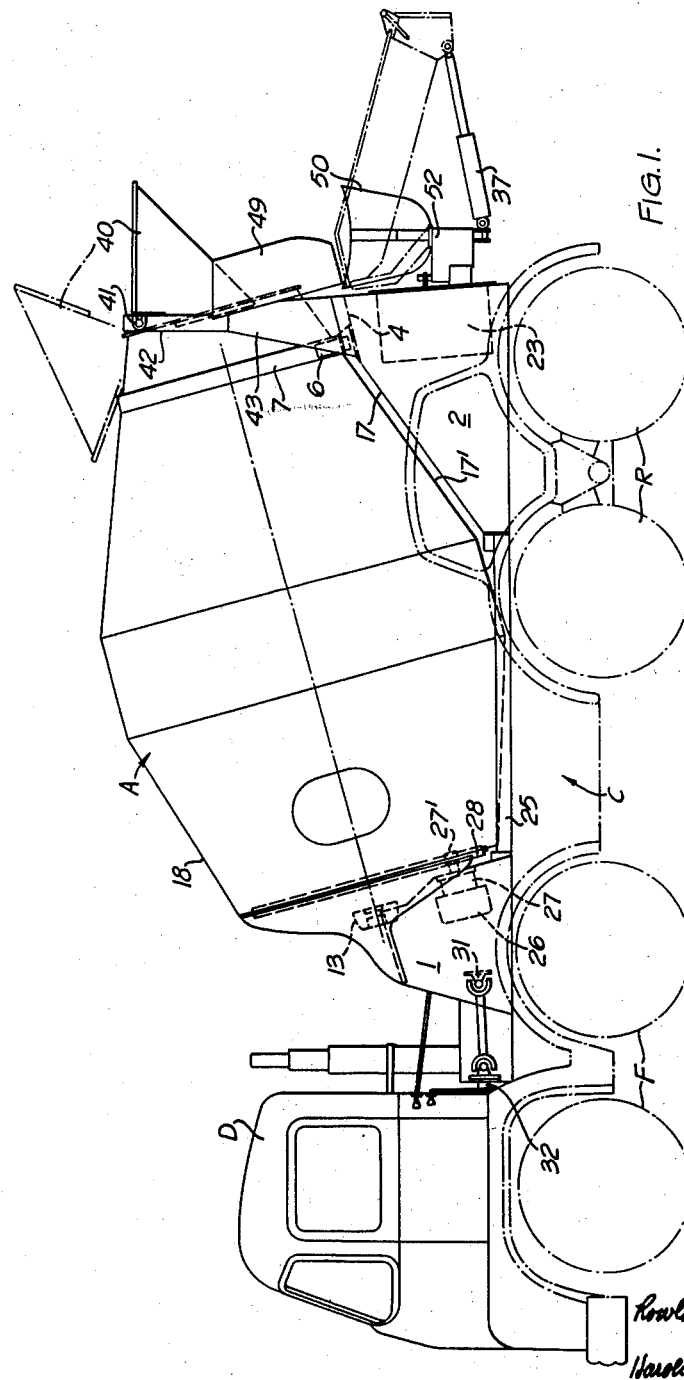
FIGURE 1 is an elevation of the truck mixer of this invention.

Referring now to FIGURES 1 and 5, feed of material to the drum by means of a large capacity feed chute 40, which is pivotally supported at its upper end 41 so that it can be moved from the position shown to that indicated in dotted lines in FIGURE 1 to give direct access to the mouth of the drum. A rubber extension (not shown) is fitted to ensure clean entry for materials into the drum cone. The hinges for the feed chute 40 are carried by an inverted U-shaped frame 42 attached to brackets 43 by which it is secured to the horizontal bridge plate 4 of the pedestal 2. The frame 42, which is formed of channel or hollow section also serves to house or to function as a feed pipe 47 leading to a central outlet pipe 48 for discharging water to the rear end of the drum. Discharge of material from the periphery of the drum mouth is by means of a pair of fixed chutes 49, 49' into a pivotally mounted distribution chute 50. The distribution chute, to which is hinged an extension piece, is mounted for pivotal movements above a vertical axis 52 so as to permit it to be swung through an angle of 180° thus providing a wide field of distribution. The hydraulically operated ram 37 is provided for raising and lowering the chute 50. A lock (not shown) can be incorporated in the pivot arm to enable the chute to be fixed in any of a number of given discharge positions for discharge on sloping sites.

What is claimed is:

1. A truck mixer having a wheeled chassis and a mixing drum suspended for rotation about a fore and aft axis on the chassis, said drum comprising a cylindrical container which is closed at its end forward of the chassis and provided with an opening for discharge of its contents to the rear of the chassis, the means of suspension for the drum including front and rear pedestals arranged respectively adjacent the front and rear ends of the chassis, a two-part housing comprising a lower part fast with said front pedestal and an upper part detachably secured to said lower part, said two parts together providing a spherical internal seat, a journal at the forward end of said drum in vertical alignment with the axis of said chassis, a bearing assembly for supporting said journal on said housing and comprising an externally spherical bearing element mounted in said spherical internal seat and roller bearings within said spherical bearing element and rotatably supporting said journal, and roller bearings on the rear pedestal spaced transversely of said axis having rolling engagement with the drum at its rear end.

2. A truck mixer having a wheeled chassis and a mixing drum suspended for rotation about a fore and aft axis on the chassis, said drum comprising a cylindrical container which is closed at its end forward of the chassis and provided with an opening for discharge of its contents to the rear of the chassis, the means of suspension for the drum including front and rear pedestals arranged respectively adjacent the front and rear ends of the chassis, a bearing mounted on said front pedestal, a central spigot on the forward end of said drum journalled in said bearing and being positioned in vertical alignment with the axis of the chassis, and roller bearings on the rear pedestal spaced transversely of said axis having rolling engagement with the drum at its rear end, said rear pedestal being fabricated to enclose a recess which is used as a tank for the storage of conditioning liquid, and an auxiliary tank for liquid additive mounted in said recess.

3. A truck mixer having a wheeled chassis having longitudinal frame members at opposite sides of said chassis and a mixing drum suspended for rotation about a fore and aft axis on the chassis, said drum comprising a cylindrical container which is closed at its end forward of the chassis and provided with an opening for discharge of its contents to the rear of the chassis, the means of suspension for the drum including front and rear pedestals arranged respectively adjacent the front and rear ends of the chassis, said rear pedestal being mounted on said chassis at three points, two of said points being located respectively on said longitudinal frame members and the third of said points being located centrally between said longitudinal frame members, a bearing mounted on said front pedestal, a central spigot on the forward end of said drum journalled in said bearing and being positioned in vertical alignment with the axis of the chassis, and roller bearings on the rear pedestal spaced transversely of said axis having rolling engagement with the drum at its rear end, said front pedestal being formed to enclose a chamber, a hydraulic motor to drive the drum and a hydraulic pump to supply said motor housed in said chamber, a discharge chute mounted on said chassis, a hydraulic ram for moving said discharge chute to operative and inoperative positions, and means including an additional pump housed in said chamber and being operable for supplying pressure fluid to said ram.

4. A truck mixer having a wheeled chassis and a mixing drum suspended for rotation about a fore and aft axis on the chassis, said drum comprising a cylindrical container which is closed at its end forward of the chassis and provided with an opening for discharge of its contents to the rear of the chassis, the means of suspension for the drum including front and rear pedestals arranged respectively adjacent the front and rear ends of the chassis, a bearing mounted on said front pedestal, a central spigot on the forward end of said drum journalled in said bearing and being positioned in vertical alignment with the axis of the chassis, and roller bearings on the rear pedestal spaced transversely of said axis having rolling engagement with the drum at its rear end, a bracket secured at its lower ends to said rear pedestal, and a trough shaped chute hinged to said bracket for feeding material to said drum, said bracket being of hollow section to provide for supplying water to said drum through its rear end.

5. A truck mixer having a wheeled chassis and a mixing drum suspended for rotation about a fore and aft axis on the chassis, said drum comprising a cylindrical container which is closed at its end forward of the chassis and provided with an opening for discharge of its contents to the rear of the chassis, the means of suspension for the drum including front and rear pedestals arranged respectively adjacent the front and rear ends of the chassis, tie bolts of hollow section extending lengthwise of the chassis and connecting said front and rear pedestals and providing for conveying fluids between the front and rear pedestals, and bearing means for supporting said drum for rotation, said bearing means comprising a housing on said front pedestal, a central spigot on the forward end of said drum rotatably mounted in said housing in vertical alignment with the axis of said chassis, and roller bearings on the rear pedestal spaced transversely of said axis having rolling engagement with the drum at its rear end.

6. A truck mixer having a wheeled chassis and a mixing drum suspended for rotation about a fore and aft axis on the chassis, said drum comprising a cylindrical container which is closed at its end forward of the chassis and provided with an opening for discharge of its contents to the rear of the chassis, the means of suspension for the drum including front and rear pedestals arranged respectively adjacent the front and rear ends of the chassis, a bearing mounted on said front pedestal, a central spigot on the forward end of said drum journalled in said bearing and being positioned in vertical alignment with the axis of the chassis, and roller bearings on the rear pedestal spaced transversely of said axis having rolling engagement with the drum at its rear end, said rear pedestal being fabricated to enclose a recess which is used as a tank for the storage of conditioning liquid and said front pedestal being formed to enclose a chamber, a hydraulic motor for driving said drum and a hydraulic pump for supplying pressure fluid to said motor, both said motor and said pump being housed in said chamber, and tie bolts connecting said front and rear pedestals, at least one of said tie bolts being hollow to provide for conveying water from the tank in said rear pedestal to the front end of said mixing drum.

7. A truck mixer having a wheeled chassis and a mixing drum suspended for rotation about a fore and aft axis or the chassis, said drum comprising a cylindrical container which is closed at its end forward of the chassis and provided with an opening for discharge of its contents to the rear of the chassis, the means of suspension for the drum including front and rear pedestals arranged respectively adjacent the front and rear ends of the chassis, a two-part housing comprising a lower part fast with said front pedestal and an upper part detachably secured to said lower part, said two parts together providing a spherical internal seat, a journal at the forward end of said drum in vertical alignment with the axis of said chassis, a bearing assembly for supporting said journal on said housing and comprising an externally spherical bearing element mounted in said spherical internal seat and roller bearings within said spherical bearing element and rotatably supporting said journal, and roller bearings on the rear pedestal spaced transversely of said axis having rolling engagement with the drum at its rear end, a hydraulic motor for driving said drum, and a hydraulic pump for supplynig pressure fluid to said motor, said rear pedestal being fabricated to enclose a chamber which is used as a tank for the storage of conditioning liquid and said front pedestal being formed to enclose a chamber within which said hydraulic motor and said hydraulic pump are housed.

8. A truck mixer having a wheeled chassis and a mixing drum suspended for rotation about a fore and aft axis on the chassis, said drum comprising a cylindrical container which is closed at its end forward of the chassis and provided with an opening for discharge of its contents to the rear of the chassis, the means of suspension for the drum including front and rear pedestals arranged respectively adjacent the front and rear ends of the chassis, a housing on said front pedestal, a central spigot on the forward end of said drum and journalled in said housing in vertical alignment with the axis of said chassis, and roller bearings on the rear pedestal spaced transversely of said axis having rolling engagement with the drum at its rear end, a hydraulic motor for driving said drum, a hydraulic pump for supplying pressure fluid to said motor, said rear pedestal being fabricated to enclose a chamber which is used as a tank for the storage of conditioning liquid and said front pedestal being formed to enclose a chamber within which said hydraulic motor and said hydraulic pump are housed, a bracket secured at its lower end to said rear pedestal, and a trough shaped chute for feeding material into said drum hinged to said bracket.

9. The truck mixer of claim 8 comprising tie bolts connecting said front and rear pedestals, one of said tie bolts being hollow to enable conveyance of fluid therethrough.

10. A truck mixer having a wheeled chassis and a mixing drum suspended for rotation about a fore and aft axis on the chassis, said drum comprising a cylindrical container which is closed at its end forward of the chassis and provided with an opening for discharge of its contents to the rear of the chassis, the means of suspension for the drum including front and rear pedestals arranged respectively adjacent the front and rear ends of the chassis, a two-part housing comprising a lower part fast with said front pedestal and an upper part detachably secured to said lower part, said two parts together providing a spherical internal seat, a journal at the forward end of said drum in vertical alignment with the axis of said chassis, a bearing assembly for supporting said journal on said housing and comprising an externally spherical bearing element mounted in said spherical internal seat and roller bearings within said spherical bearing element and rotatably supporting said journal, roller bearings on the rear pedestal spaced transversely of said axis having rolling engagement with the drum at its rear end, and means for rotating the drum including a toothed ring on the forward end of the drum, and a drive pinion engaging said ring, the point of engagement being beneath said housing and slightly offset from its centre line.

11. A truck mixer having a wheeled chassis and a mixing drum suspended for rotation about a fore and aft axis on the chassis, said drum comprising a cylindrical container which is closed at its end forward of the chassis and provided with an opening for discharge of its contents to the rear of the chassis, the means of suspension for the drum including front and rear pedestals arranged respectively adjacent the front and rear ends of the chassis, a two-part housing comprising a lower part fast with said front pedestal and an upper part detachably secured to said lower part, said two parts together providing a spherical internal seat, a journal at the forward end of said drum in vertical alignment with the axis of said chassis, a bearing assembly for supporting said journal on said housing and comprising an externally spherical bearing element mounted in said spherical internal seat and roller bearings within said spherical bearing element and rotatably supporting said journal, roller bearings on the rear pedestal spaced transversely of said axis having rolling engagement with the drum at its rear end, a hydraulic motor for driving said drum, a hydraulic pump for supplying pressure fluid to said motor, said rear pedestal being fabricated to enclose a chamber which is used as a tank for the storage of conditioning liquid and said front pedestal being formed to enclose a chamber within which said hydraulic motor and said hydraulic pump are housed, a bracket secured at its lower end to said rear pedestal, and a trough shaped chute for feeding material into said drum hinged to said bracket.

12. A truck mixer having a wheeled chassis and a mixing drum suspended for rotation about a fore and aft axis on the chassis, said drum comprising a cylindrical container which is closed at its end forward of the chassis and provided with an opening for discharge of its contents to the rear of the chassis, the means of suspension for the drum including front and rear pedestals arranged respectively adjacent the front and rear ends of the chassis, a two-part housing comprising a lower part fast with said front pedestal and an upper part detachably secured to said lower part, said two parts together providing a spherical internal seat, a journal at the forward end of said drum in vertical alignment with the axis of said chassis, a bearing assembly for supporting said journal on said housing and comprising an externally spherical bearing element mounted in said spherical internal seat and roller bearings within said spherical bearing element and rotatably supporting said journal, roller bearings on the rear pedestal spaced transversely of said axis having rolling engagement with the drum at its rear end, means for rotating the drum including a toothed ring on the forward end of the drum, a drive pinion engaging said ring, the point of engagement being beneath said housing and slightly offset from its centre line, a hydraulic motor for driving said pinion, and a hydraulic pump for supplying pressure fluid to said motor, said rear pedestal being fabricated to enclose a chamber which is used as a tank for the storage of conditioning liquid and said front pedestal being formed to enclose a chamber within which said hydraulic motor and said hydraulic pump are housed, a bracket secured at its lower end to said rear pedestal, a trough-shaped chute for feeding material into said drum hinged to said bracket, and tie bolts connecting said front and rear pedestals, one of said tie bolts being hollow to enable transmission of conditioning liquid from the tank in the rear pedestal to the front of the mixer drum.

13. In a truck mixer, a wheeled chassis having longitudinal frame members at opposite sides of said chassis; a mixing drum having a central section and front and rear sections respectively tapering from said central section to front and rear drum ends of less diameter than said central section; means supporting said drum for rotation on said chassis with the drum axis of rotation extending fore and aft of said chassis, said supporting means comprising a front pedestal on said chassis mounting the front end of said drum with the axial center of said front end at a relatively low level above said chassis, and a rear pedestal on said chassis mounting the rear end of said drum with the axial center of said rear end at a relatively higher level above said chassis, said rear pedestal being mounted on said chassis at three points, two of said points being located respectively on said longitudinal frame members and the third of said points being located centrally between said longitudinal frame members, said relatively low level and said relatively higher level being so related to one another and to the tapering of said drum front and rear sections that the lower surface of said tapering front section of said drum is substantially parallel to said chassis and the lower surface of said tapering rear section of said drum is inclined upwardly and rearwardly from said drum central section toward the drum rear end, whereby to provide a space between said lower surface of said tapering rear section of said drum and said chassis; a water tank in said space; and means for delivering water from said tank to said drum.

14. Construction according to claim 13 in which said rear pedestal has sides with upper edges inclined upwardly and rearwardly conformingly to the upward rearward inclination of said lower surface of said tapering rear section of said drum, said sides of said rear pedestal defining the sides of said space containing said water tank.

15. Construction according to claim 13 including tie bolts extending lengthwise of said chassis and connecting said front and rear pedestals, at least one of said tie bolts being hollow and providing for conveying water from said tank to the front end of said mixing drum.

16. Construction according to claim 13 including drive means for rotating said drum, said drive means comprising a hydraulic pump and a hydraulic motor both housed within said front pedestal, said motor being operable by pressure fluid supplied by said pump; a pinion drivable by said motor; and a toothed ring on the front end of said drum engaging said pinion, the point of engagement of said pinion and said toothed ring being slightly offset from the axis of rotation of said drum.

References Cited by the Examiner

UNITED STATES PATENTS

| 2,415,989 | 2/47 | Bohmer | 259—177 |
| 2,676,003 | 4/54 | Oury | 259—177 |
| 2,729,435 | 1/56 | Harbers et al. | 259—172 |
| 2,793,013 | 5/57 | Mittelstadt | 259—177 X |
| 3,080,152 | 5/63 | Lendved | 259—177 |

FOREIGN PATENTS

| 837,375 | 6/60 | Great Britain. |

CHARLES W. WILLMUTH, *Primary Examiner.*